United States Patent [19]

Curran

[11] Patent Number: 4,474,450
[45] Date of Patent: Oct. 2, 1984

[54] CAMERA TO FLASH ADAPTER

[75] Inventor: Kenneth J. Curran, Thousand Oaks, Calif.

[73] Assignee: Vivitar Corporation, Santa Monica, Calif.

[21] Appl. No.: 306,245

[22] Filed: Sep. 28, 1981

Related U.S. Application Data

[63] Continuation of Ser. No. 19,297, Mar. 12, 1979, abandoned.

[51] Int. Cl.³ ............................ G03B 7/16; G03B 15/05
[52] U.S. Cl. ..................................... 354/416; 354/418; 354/484
[58] Field of Search ............................ 354/27, 32–35, 354/60 F, 59, 126, 140, 141, 139, 145, 149, 416, 418, 484, 483, 417

[56] References Cited

U.S. PATENT DOCUMENTS

| | | | |
|---|---|---|---|
| 3,614,918 | 10/1971 | Henniu et al. | 354/33 X |
| 3,769,888 | 11/1973 | Quinn | 354/34 |
| 3,846,806 | 11/1974 | Yata et al. | 354/33 X |
| 4,021,824 | 5/1977 | Uchiyama et al. | 354/149 X |
| 4,078,242 | 3/1978 | Uchiyama et al. | 354/139 |
| 4,095,242 | 6/1978 | Tsunekawa et al. | 354/149 X |
| 4,311,372 | 1/1982 | Gahler | 354/60 F X |

FOREIGN PATENT DOCUMENTS 1930971 12/1970 Fed. Rep. of Germany ...... 354/145
1424067 2/1976 United Kingdom ............... 354/141

Primary Examiner—William B. Perkey
Attorney, Agent, or Firm—Lyon & Lyon

[57] ABSTRACT

A system and method for adapting a multi-purpose electronic flash for use with an automatic exposure control camera is disclosed. The system responds to a ready signal from the multi-purpose flash and a reference signal from the automatic exposure control camera by providing a signal representative of the correct aperture for a given film speed (ASA) and range of flash to subject distances. Film speed is provided to the system by setting one portion of a variable resistance, while range is provided to the system by setting another portion of the variable resistance which is associated with a graded density optical filter located in front of the photosensor. A bipolar range about the reference signal is established to permit positive or negative signal excursions about the reference signal for indication of correct aperture. A scaling amplifier may also be provided for signal conditioning to ensure compatibility with the camera. The scaling amplifier may be arranged to provide less than unity amplification, thereby reducing system error. A special housing connects between the foot of the flash and the camera to provide access to the camera accessory shoe terminals and also to permit the flash to be operated on or off the camera. Various alternatives are disclosed.

18 Claims, 7 Drawing Figures

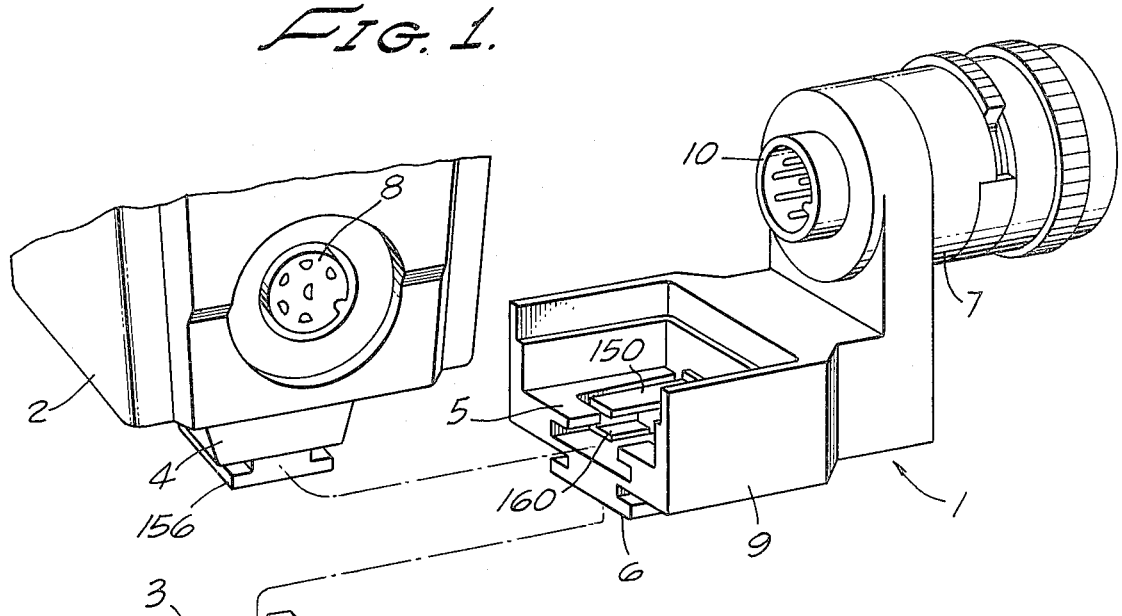
FIG. 1.
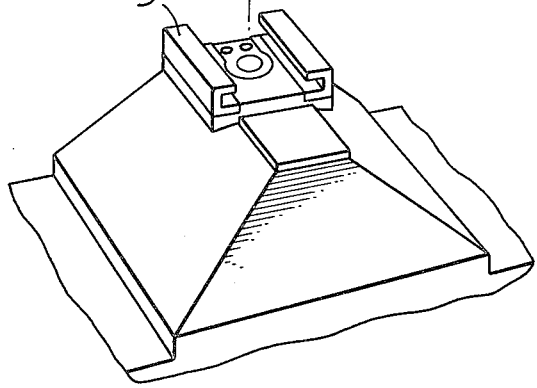
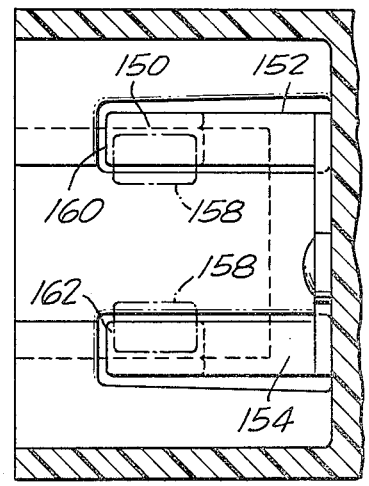
FIG. 4c.
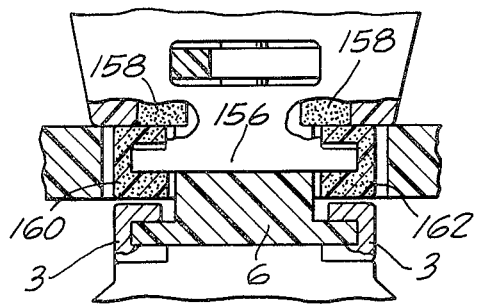
FIG. 4b.
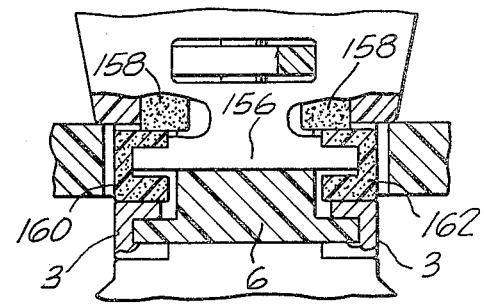
FIG. 4d.

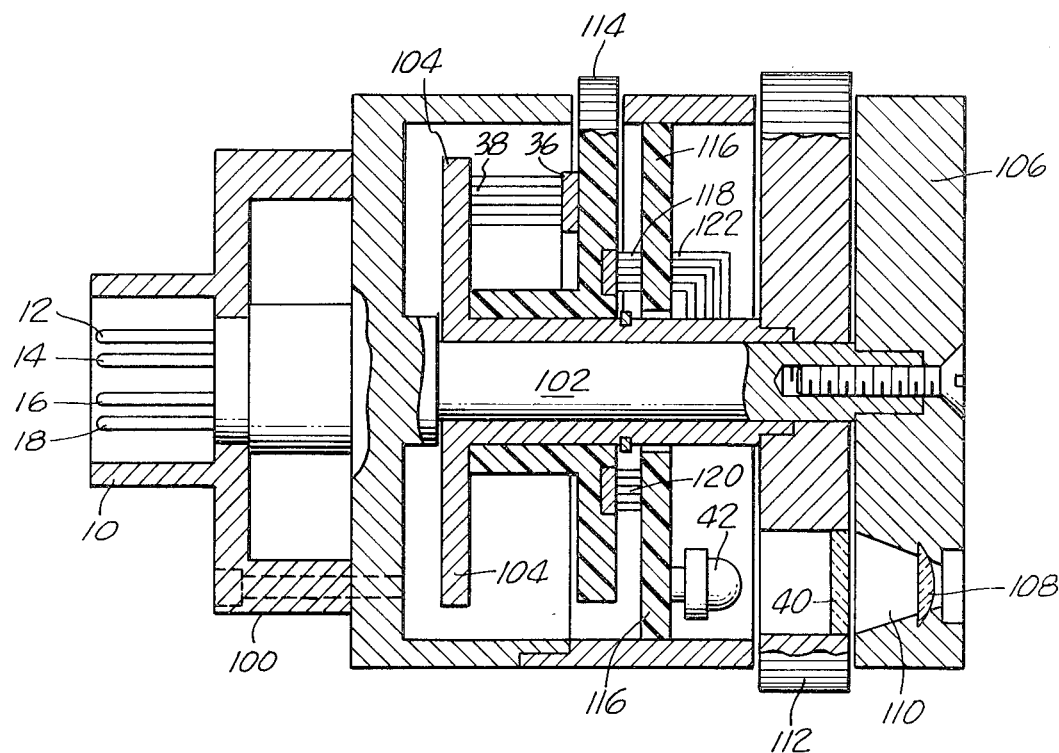

CAMERA TO FLASH ADAPTER

This is a continuation of application Ser. No. 19,297, filed, Mar. 12, 1979, now abandoned.

FIELD OF THE INVENTION

The present invention relates generally to automatic flash devices, and more particularly to automatic flash devices for use with automatic exposure control cameras.

BACKGROUND OF THE INVENTION

Automatic flash equipment has been developed wherein the amount of light supplied by the flash is determined by range, which is a combination of the reflectivity of the scene together with flash to subject distance of the background of the invention, camera aperture, and film speed. In such equipment the flash tube is turned off, or quenched, when sufficient light has been reflected from the scene for the selected aperture and film speed. One such automatic flash is disclosed in U.S. Pat. No. 3,809,951.

More recently, similar automatic flashes have been developed for use with automatic exposure cameras such as the Canon AE-1, the Olympus OM-2 and others. Examples of such systems are disclosed in U.S. Pat. Nos. 4,047,194; 4,079,385; 4,078,242; and 4,095,242. Such flash systems are usually dedicated for use with the particular camera, and operate in conjunction with the exposure control system of the automatic exposure camera, and more usually a shutter-preferred automatic exposure camera, to determine the amount of light to be supplied by the flash. In general, the dedicated flash provides a signal to the camera which causes the camera to automatically pre-set the aperture, and the flash, when fired, supplies only the amount of light appropriate for that aperture. Also, the dedicated flash provides a ready signal which causes the camera to set the shutter to a flash synchronization speed. However, it has thus far not been possible to operate the dedicated flash remotely from the camera in conjunction with the exposure control system of the camera, while sensing the amount of reflected light received at the camera.

Thus far, however, it has not been possible to use a conventional automatic flash in conjunction with the automatic exposure feature of such cameras. Thus the purchase of such an automatic exposure camera has required the purchase of an associated, dedicated flash, or the use of the automatic exposure camera in a manual mode with a conventional automatic flash. There has therefore been a need for a means by which conventional automatic flash could be adapted for use in conjunction with the exposure control system of an automatic exposure camera, and which would permit off camera operation while still sensing the amount of reflected light received at the camera.

SUMMARY OF THE INVENTION

The present invention provides a means and apparatus by which a conventional automatic flash may be adapted for use with the exposure control systems of automatic exposure cameras.

The adapter of the present invention utilizes signals available from the automatic exposure camera together with those from a non-dedicated or multi-purpose flash to cause the camera to set the shutter to a flash synchronization speed. The adapter also causes the aperture of the automatic exposure camera to be set in accordance with the inputs to the flash for film speed and range. Turn-off circuitry of the flash then quenches the flash tube when the amount of light appropriate for the selected aperture has been emitted.

The adapter causes the camera to set the shutter to a flash synchronization speed in response to a ready signal from the flash itself. The ready signal permits a buffer amplifier of the adapter to draw current from the reference terminal of the camera, thereby causing the camera to set the shutter to a speed synchronized for flash photography.

In addition, film speed and range are optically and electrically encoded into the adapter by means of a variable resistance associated with a graded density optical filter, in combination with other circuitry. Unlike prior art dedicated flashes, the adapter of the present invention may be arranged to provide a continuum of ranges as well as providing a more efficient method for encoding such information.

The encoded film speed and range are translated by the adapter into an aperture setting signal by means of a multiplying amplifier and a scaling amplifier. The multiplying amplifier provides a signal which is amplified with respect to the reference signal provided by the camera. The output of the multiplying amplifier is then divided through the variable resistance to provide a signal representative of the appropriate aperture for the film speed and range settings.

The aperture signal is then scaled for use with the particular camera by means of a scaling amplifier. For the embodiment described herein, the gain of the scaling amplifier stage is less than unity, thereby proportionately reducing any error resulting in earlier stages of the adapter circuitry. The scaling amplifier also subtracts the camera reference voltage, resulting in an aperture setting signal which is bipolar about the camera reference signal and compatible therewith. This signal is then supplied to the camera and causes the correct aperture to be selected for the particular conditions.

Additionally, the adapter of the present invention includes a housing which mounts between the flash and the camera accessory shoe and locks the flash and adapter onto the camera. The housing provides access between the terminals located on the camera accessory shoe and the circuitry of the adapter. Also, the multi-purpose flash may be cable connected to the adapter to permit the flash to be remotely located even though the adapter remains attached to the camera. This permits remote flash positioning while still sensing the amount of light reflected to the camera.

It is therefore one object of the present invention to provide an apparatus suitable for permitting a non-dedicated flash to be used with the automatic exposure circuitry of a camera.

It is another object of the present invention to provide a new method of encoding information.

It is yet another object of the present invention to provide a novel method of providing film speed and range information to camera automatic exposure circuitry.

These and other objects of the present invention can be better appreciated from the following detailed description together with the appended drawings, in which FIG. 1 illustrates in exploded view the relationship of the multi-purpose flash, the adapter of the present invention including its housing, and the accessory shoe of an automatic exposure camera;

FIG. 3 is a cross-sectional side view of the sensor mechanism of the embodiment shown in FIG. 2;

FIG. 4a is a side view of the adapter of the present invention mounted between the camera and the flash;

FIG. 4b and 4d are cut-away side view of FIG. 4a showing the locking feature of the adapter of the present invention; and FIG. 4c is a detail plan view of the interior of the adapter base showing the locking feature of the present invention.

DETAILED DESCRIPTION OF THE INVENTION

Figure 2:
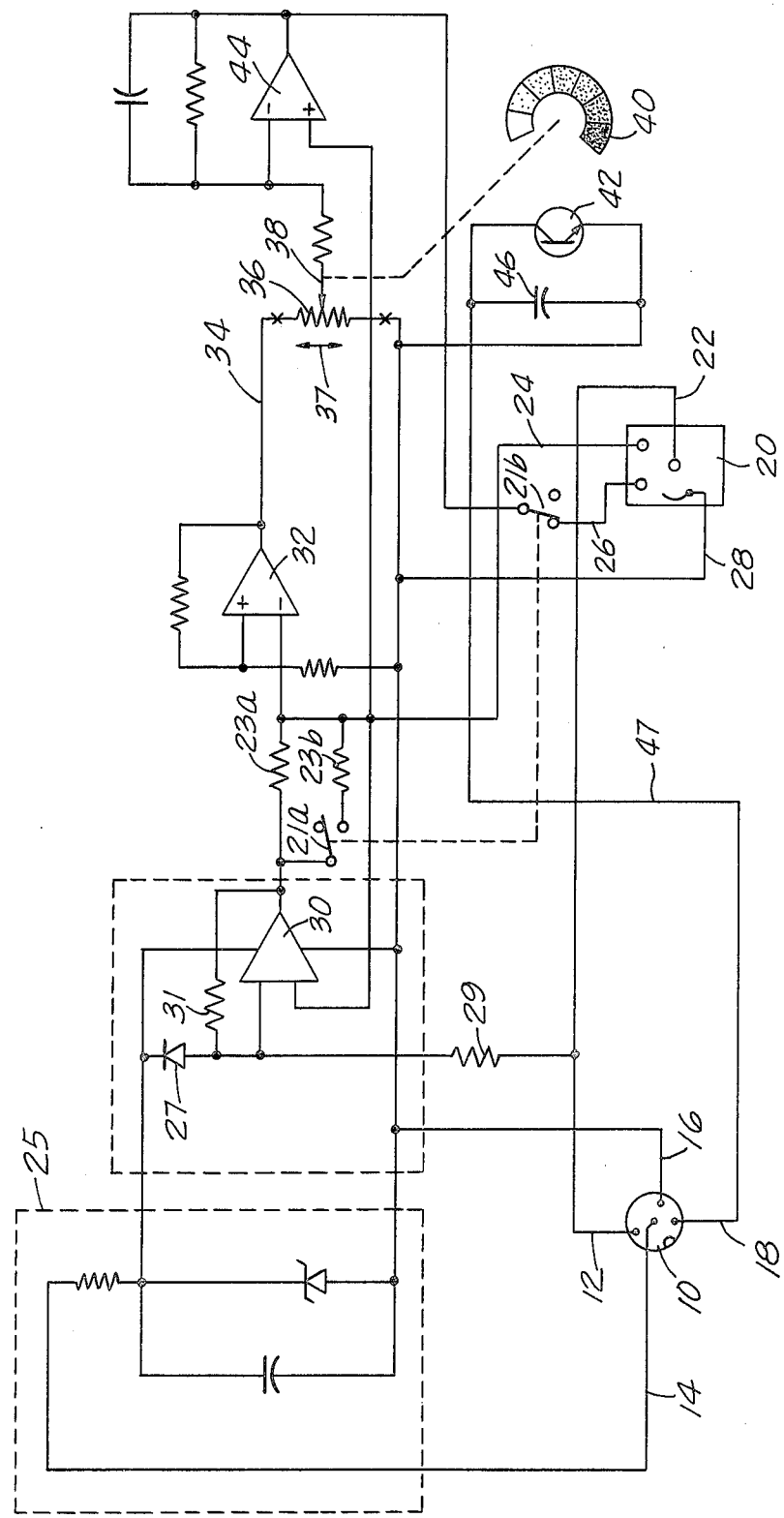
FIG. 2 is a schematic diagram of the circuitry of one embodiment of the present invention.

Referring first to FIG. 1, the relationship between the adapter of the present invention 1, a multi-purpose flash 2 and the accessory shoe 3 of an automatic exposure camera is shown. One suitable flash is the Vivitar Model 285, and a suitable automatic exposure camera is the Canon AE-1, although many similar devices are suitable for use with the present invention. As can be seen from FIG. 1, the foot 4 of the flash 2 fits into a shoe 5 of a housing 9 of the adapter 1, and the adapter 1 couples to the accessory shoe 3 by means of a base, all of which are described in greater detail in connection with FIGS. 4a-4c. Additionally, the sensor portion 7 of the adapter 1 couples to a socket 8 of the flash 2 where a removable sensor is normally located, as described in greater detail hereinafter.

Referring now to FIG. 2, which illustrates in schematic diagram form the circuitry of one embodiment of the present invention, it can be seen that the adapter 1 couples to the flash 2 by means of a connector 10 which includes a plurality of pins 12, 14, 16 and 18 (also shown in FIG. 1). Also, the adapter 1 couples to the terminals of the accessory shoe 3 by means of a connector 20 having thereon electrical terminals 22, 24, 26 and 28 arranged to match the corresponding terminals on the accessory shoe 3 of the camera. A flash trigger signal is supplied at the terminal 22, while a camera reference signal is supplied at the terminal 24. The adapter 1 supplies an aperture setting signal to the camera via the terminal 26 as described in detail hereinafter. The terminal 28 connects the ground or common signal on the adapter to that signal on the camera.

When the flash 2 is connected via the adapter 1 to the camera and the flash is sufficiently charged to be tiggerable, a ready signal develops on the pin 12, which is also tied to the trigger terminal 22. The ready signal may be developed by monitoring the anode voltage of the electronic flash, or may be supplied by a detector, such as a comparator, internal to the flash, for example the detector contained within the Vivitar Model 285 flash. If the flash ready signal is not supplied by a detector internal to the flash, the terminals 12 and 22 will preferably not be directly connected.

Until the ready signal develops on the pin 12, the output of an amplifier 30 is maintained at the same voltage as the camera reference signal at the pin 24 by means of biasing resistors 29 and 31 and a protective diode 27. The resistors 29 and 31 and the diode 27 provide good standoff protection in the event a high voltage signal is inadvertently connected to the terminal 22. Power for amplifier 30 and the remaining circuitry of FIG. 2 is provided by a power supply indicated generally at 25 and connected to the capacitor anode voltage of the flash via the terminal 14.

When the flash ready signal develops on the pin 12, the output of the amplifier 30 goes low and causes current to be drawn from the reference voltage supplied at the terminal 24 through one of resistors 23a or 23b, depending on the state of switches 21a and 21b. The switch 21a is provided to permit use of the "dark sync" feature available on certain cameras such as the Canon A-1, wherein shutter speeds slower than normal flash synchronization speed may be manually selected. The switch 21b permits the adapter to be used in a manual mode by disconnecting the aperture setting signal discussed hereinafter from the terminal 26.

Once the amplifier 30 causes current to be drawn from the reference voltage at terminal 24, a camera such as the Canon AE-1 provides a flash ready signal to the shutter. This causes the shutter to interlock at the flash synchronization speed regardless of the position of the shutter speed selector dial on the camera. At the same time, the reference voltage at the terminal 24 is also supplied to a buffer amplifier 32 where it is multiplied. Typically, the reference signal may be nominally 1.3 volts, and will be doubled by the buffer amplifier 32 although any other multiple, including fractional multiples, is suitable. The multiplied output signal of the amplifier 32 is supplied to a line 34, which connects to one terminal of the body 36 of a variable resistance 37. The remaining terminal of the body 36 of the variable resistance connects to the common signal, or ground, at pin 16 of the connector 10 and likewise at pin 28 of the connector 20.

As will be discussed hereafter in connection with FIG. 2, the body 36 of the variable resistance is movable with respect to the wiper 38 thereof to provide an indication of film speed, or ASA. The wiper arm 38 of the variable resistance is mechanically connected to a graded density optical filter 40 placed in front of a photosensor 42 (better shown in FIG. 3). As further shown in FIG. 3, the wiper arm 38 and optical filter 40 are jointy movable to provide a continuous indication of range settings. The wiper 38 and body 36 of the variable resistance are each therefore relatively movable to provide continuous settings representative of film speed and range.

Once the position of the body 36 of the variable resistance 37 and wiper 38 have been set for the paricular photograph, the multiplied reference signal on the line 34 is then voltage divided by the variable resistance 37. The result is a reduced signal at the wiper arm 38, which is supplied as one input to a scaling amplifier 44. The remaining input to the scaling amplifier 44 and associated circuitry is provided by the reference signal from the camera on pin 24.

Depending upon the gain of the amplifier stage 32, the gain of the amplifier stage 44 may be less than unity. The purpose of the amplifier stage 44 is to scale the aperture setting signal provided on wiper arm 38 to be compatible with the circuitry of the particular camera. For example, for the Canon AE-1, a voltage change of nominally seventy-five millivolts with respect to the reference voltage on the pin 24 indicates an aperture change of approximately one stop. Also, the reference voltage typically represents an aperture setting of f/4, so that the increment representative of an aperture change may be either positive or negative with respect to the reference voltage. Also, the scaling amplifier 44 buffers the relatively high impedance variable resistance 37, which may for example be on the order of twenty kilohms, to prevent undue loading on the relatively low impedance exposure control circuitry of the camera.

Thus, by providing a signal on the line 34 which is greater than the reference voltage at pin 24, it is possible to provide a bipolar range about the reference signal. Then, where the signal available at the line 34 permits greater than a seventy-five millivolts increment to indicate one f/stop change in aperture, the scaling amplifier 44 may have a gain of less than unity. This is advantageous because it provides a proportionate reduction in any sensing or integrating errors which may develop in the preceding portions of the circuit. When the properly scaled aperture setting signal from the amplifier stage 44 is provided to the camera via the pin 26, the circuitry of the camera causes the diaphragm to adjust to the proper setting for the particular range and film speed information supplied at the variable resistance 36.

Once the flash is triggered, the light is reflected from the scene and passes through the optical filter 40 onto the photosensor 42 and its associated capacitor 46. This provides a signal to the turn-off circuitry of the flash via the pin 18 to cause the flash to limit the emitted light to an amount appropriate to the selected aperture. Thus a new and novel method of encoding information has been disclosed. In the event it is desirable to operate the flash in a manual mode so that the switch 21b is in the manual position, and also to reduce the amount of light emitted by the flash as in the case of flash fill, weighted resistors may be connected between a line 47 and the terminal 28 (ground) together with a suitable switching means (not shown) for selecting either the automatic mode or the desired manual setting. Such variable power settings are available in the Vivitar Model 285 flash.

Referring now to FIG. 3, there is shown therein a mechanical arrangement for one embodiment of the sensor portion 7 only of the adapter of the present invention. The sensor portion is a portion of the adapter 1 shown in FIG. 1 and FIGS. 4a–4c. A housing 100 forms the connector 10 and encloses the pins 12, 14, 16 and 18 as well as the remainder of the apparatus. Enclosed within the housing is a fixed shaft 102, which supports a rotatable metal shaft 104. Affixed to the end of the shaft 102 is a cover 106, which houses a lens or other suitable light gathering means 108 in a passageway 110 therethrough. Affixed to the shaft 104 and rotatable therewith is a ring or plate 112, a portion of which includes the optical filter 40 shown in FIG. 2. The wiper 38 associated with the optical filter 40 connects between the rotatable shaft 104 and the body of the variable resistance 36, which is affixed to another rotatable member 114. The terminals of the body of the variable resistance 36 have been supplied to the associated circuitry shown in FIG. 2 and located on a printed circuit (PC) board 116 via a pair of wipers 118 and 120. The position of the wiper 38 is communicated to the PC board via the conductive shaft 104 and another wiper 122. It can thus be seen that both film speed (ASA) and range may be readily altered merely by rotating the appropriate members 112 or 114. In the event a variable power feature is desired, an additional rotatable member may be included for selecting the desired weighting resistor.

Rotation of the member 112 causes the setting of the potentiometer for variable resistance 36 to vary, and also varies the optical density of the filter 40 in front of the sensor 42, also located on the PC board 116. The optical filter 40 may be a wedge filter or other suitable filtering means, and provides direct coupling between the optical system and the exposure control circuit of the automatic exposure camera. It can therefore be appreciated that the system of the present invention provides a new and novel means of formatting information for use in an electro-optial system. It can further be appreciated that the system of the present invention permits a non-dedicated automatic flash to be used in conjunction with the automatic exposure control system of a camera.

Referring again to FIG. 1 and also to FIGS. 4a–4d, the mechanical features of the adapter 1 of the present invention may be better appreciated. As can be seen from FIGS. 1 and 4a, the adapter 1 couples to the flash at both the socket 8 and the foot 4 of the flash 2 by means of the connector 10 and the shoe 5, respectively. For a shutter-preferred camera such as the Canon AE-1, the sensor portion 7 of the adapter 1 is formed integrally with the housing 9. However, for other automatic exposure cameras such as the aperture-preferred automatic exposure cameras manufactured by Olympus, Nikon and Minolta, the housing 9 will include only a connector 10 and another socket 7 into which the normally supplied sensor, such as the removable sensor supplied with the Vivitar Model 285 flash, may be connected. The shoe 5 of the adapter includes a conventional flash trigger terminal 140 and ground terminal 142.

As noted previously, one of the many advantages of the present invention is that it permits an automatic flash to be operated remotely in conjunction with the exposure control circuitry of an automatic exposure camera, while still monitoring the reflected light received at the camera. This is accomplished by detaching the flash from the adapter 1 and connecting the socket 7 to the connector 10 by means of a conventionally available cable (not shown) such as that manufactured by Vivitar Corporation. This leaves the photosensor portion of the system located at the camera to monitor reflected light, while permitting remote location of the flash itself. Because the adapter 1 includes the circuitry for making the flash compatible with the particular camera, access to the camera's exposure control circuitry is maintained.

Referring now to FIGS. 4b–4d, additional features of the present invention can be better appreciated. FIG. 4c shows in plan view the shoe 5 of the adapter 1, into which the flash 2 slides. FIGS. 4b, 4d illustrate in cross-sectional side view the assembly of the flash foot 4, the shoe 5, the base 6 and the camera accessory shoe 3. The shoe 5 includes a deformable insert 150 which extends through the shoe 5 to the space above the base 6 into which the accessory shoe 3 fits. The deformable insert 150 operates in conjunction with a locking mechanism such as that found on the Vivitar Model 285 flash to securely fasten the flash to the adapter and also fasten the adapter 1 to the accessory shoe 3.

The deformable insert 150, which may for example be made of Delrin or other suitable material, includes a pair of flat plates 152 and 154 located between the upper portion of the foot 4 and the base plate 156 (FIG. 1) thereof on the flash 2. When the locking mechanism of the flash is actuated, a resilient plate 158 on each side of the foot 4 is driven downward onto the deformable insert 150 at the plates 152 and 154. The force on the plates 152 and 154 causes them to deform slightly, in turn deforming a pair of ears 160 and 162 associated with the plates 152 and 154, respectively.

The ears 160 and 162 extend through the shoe 5 to the space above the base 6 and also above the camera accessory shoe 3 (FIG. 4b). When the flash locking mechanism is actuated to cause the ears 106 and 162 to deform, the ears 160 and 162 are forced down onto the top of the accessory shoe 3, thereby locking both the flash 2 and the adapter 1 onto the camera (FIG. 4d). When the flash locking mechanism is released, the insert 150 returns to its original position and the flash, adapter and accessory shoe may be easily separated.

Having fully described one embodiment of the present invention, it is to be understood that many equivalents and alternatives which do not depart from the spirit of the invention will be apparent from the teachings hereof to those skilled in the art. It is therefore to be understood that each of these alternatives and equivalents which do not depart from the spirit of the invention are intended to be included herein.

What is claimed is:

1. An adapter for coupling a multi-purpose electronic flash having sensor connections to the exposure control system of an automatic exposure camera comprising
   first coupling means for electrically connecting said adapter to at least the sensor connections of a multi-purpose electronic flash,
   second coupling means for connecting said adapter to the exposure control system of an automatic exposure camera, including a reference signal from the exposure control system,
   variable resistance means for encoding film speed and range information, a portion of said variable resistance means being coupled to an optical filter associated with a photosensing means, and
   amplifier means responsive to the reference signal and said variable resistance means for generating a signal representative of an aperture determined at least in part by said encoded information.

2. The invention of claim 1 wherein film speed information is encoded by positioning a first portion of said variable resistance means, and range information is encoded by positioning a second portion of said variable resistance means relative to said first portion.

3. The invention of claim 2 wherein said optical filter is coupled to the second portion of said variable resistance means.

4. The adapter of claim 1 wherein said amplifier means includes means for generating a range of signals which is bipolar about the reference signal.

5. The adapter of claim 4 wherein said amplifier means further includes scaling amplifier means for causing said aperture-representative signal to be compatible with the exposure control system of the automatic exposure camera.

6. The adapter of claim 5 wherein said scaling amplifier has less than unity gain to reduce error.

7. An adapter for connecting a camera and a flash unit wherein the flash unit includes a capacitor, a flash tube, discharge means for discharging said capacitor through said flash tube, and flash-termination means for terminating the discharge of said capacitor through said flash tube, and means for providing a signal that the flash unit is in a ready state, said adapter comprising
   camera terminals for connection to said camera,
   flash unit terminals for connection to said flash unit,
   synchronizing means coupling camera and flash unit terminals for conveying a synchronizing signal from said camera to said flash unit for initiating operation of said discharge means,
   circuit means for receiving said signal that the flash unit is in a ready state and for causing a photographic paramter setting signal to be applied to the camera,
   power means connected to at least one of said flash unit terminals for receiving operating power for said circuit means from said flash unit, and
   a terminal for said adapter for connection to a terminal of said flash unit for conveying a signal to said flash termination means to initiate operation thereof.

8. An adapter for connecting a multi-purpose electronic flash having sensor connections to an exposure control system of an automatic camera which includes at least a shutter speed setting connection comprising
   first coupling means for electrically connecting said adapter to at least the shutter speed setting connection of the exposure control system of the camera,
   circuit means for causing the shutter speed of the camera to be set to an appropriate speed for flash photography,
   sensor means for detecting the amount of light reflected from a scene to the camera when the multi-purpose flash is fired, and
   second coupling means for connecting said sensing means to at least the sensor connections of a multi-purpose flash to provide at least one signal to the flash for determining when a sufficient amount of light has been emitted for the scene being photographed.

9. An adapter as in claim 8 wherein
   operating power for the circuit means of the adapter is received from said electronic flash.

10. The adapter of claim 8 wherein the multi-purpose flash is remotely located from said sensing means.

11. The adapter of claim 8 further including third coupling means for coupling the foot of the multi-purpose flash to said adapter.

12. An adapter for connecting a camera and a flash unit wherein the flash unit includes a capacitor, a flash tube, discharge means for discharging said capacitor through said flash tube, and flash-termination means for terminating the discharge of said capacitor through said flash tube, and means for signalling that the flash unit is in a ready state, said adapter comprising
   a set of camera terminals for connection to said camera,
   a set of flash unit terminals for connection to said flash unit,
   synchronizing means for coupling said camera and flash unit terminals for conveying a synchronizing signal from said camera to said flash unit for initiating operation of said discharge means,
   photographic parameter means for conveying a ready signal from the flash unit to circuit means of the adapter and for causing a photographic parameter setting signal to be applied to the camera,
   photometric means in said adapter for responding to reflection of light developed by said flash unit, and
   a terminal for said adapter for connection to a terminal of said flash unit for conveying a signal from said photomeric means to said flash termination means to initiate operation thereof.

13. An adapter as in claim 12 werein
   said circuit means of the adapter causes a first photographic parameter setting signal to be applied to the camera for setting the camera shutter speed to an appropriate speed for flash photography and provides a second photographic parameter setting signal for setting the aperture of a lens of the camera.

14. An adapter as in claim 13 wherein
said circuit means of the adapter comprises means for electrically setting film speed and flash range and wherein settings for film speed and flash range affect said second photographic parameter setting signal.

15. An adapter as in claim 12 wherein
said flash unit terminals of said adapter include a terminal for receiving operating power for the adapter from a flash unit.

16. An adapter as defined in claim 12 arranged for direct mounting between said flash unit and camera to provide a physical connection therebetween.

17. An adapter for connecting a camera and a flash unit wherein the flash unit includes a capacitor, a flash tube, discharge means for discharging said capacitor through said flash tube, and flash-termination means for terminating the discharge of said capacitor through said flash tube, said adapter comprising
 a set of camera terminals for connection to said camera,
 a set of flash unit terminals for connection to said flash unit,
 synchronizing means for coupling said camera and flash unit terminals for conveying a synchronizing signal from said camera to said flash unit for initiating operation of said discharge means,
 photographic parameter means for conveying a signal from the flash unit to circuit means of the adapter and for causing an aperture setting signal to be applied to the camera,
 photometric means in said adapter for responding to reflection of light developed by said flash unit, and
 a terminal for said adapter for connection to a terminal of said flash unit for conveying a signal from said photomeric means to said flash termination means to initiate operation thereof.

18. An adapter as in claim 17 wherein
said flash unit terminals of said adapter include a terminal for receiving operating power for the adapter from a flash unit.

* * * * *